May 17, 1932. A. STRAHM 1,859,179
RAKE CLEANING DEVICE
Filed March 9, 1931
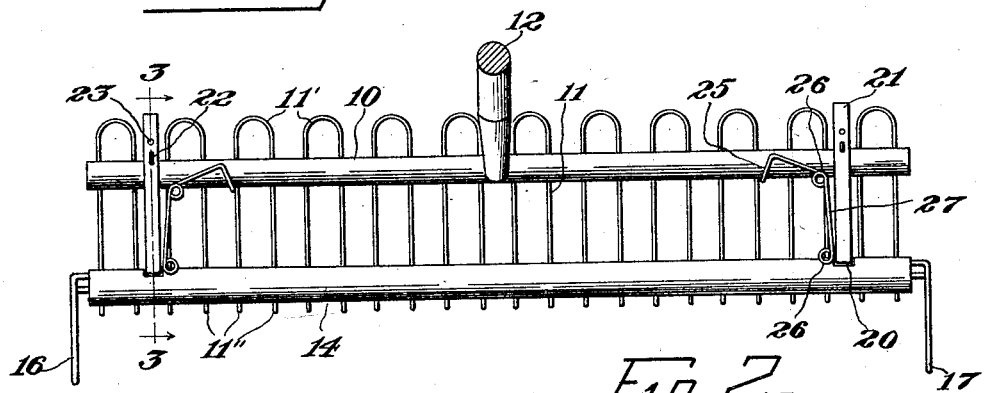
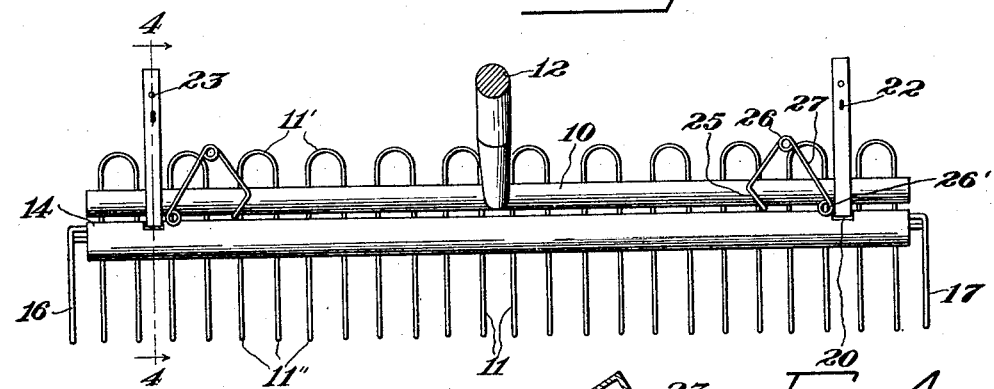
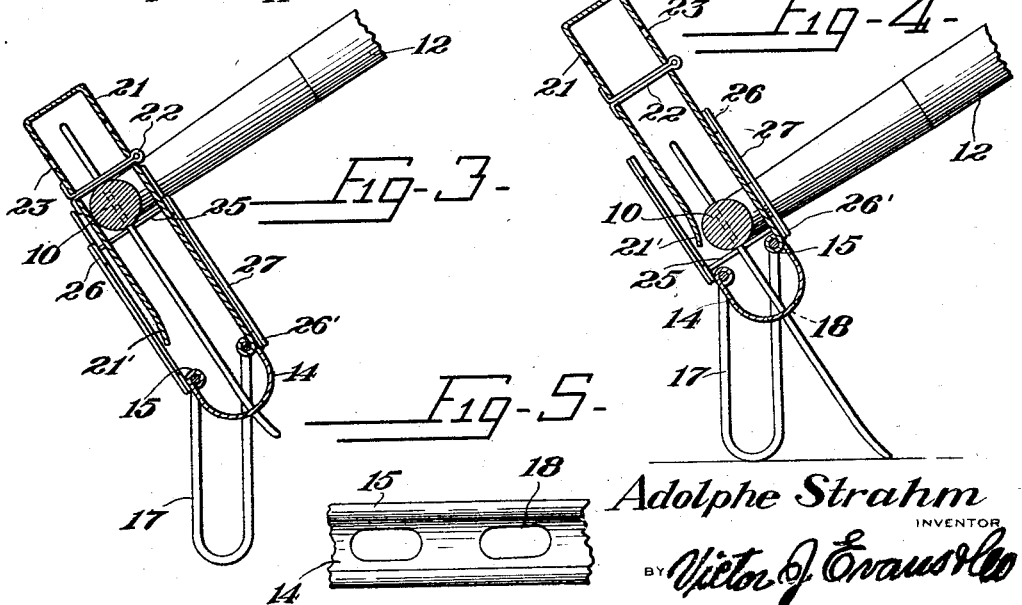
Adolphe Strahm
INVENTOR Patented May 17, 1932

1,859,179

UNITED STATES PATENT OFFICE

ADOLPHE STRAHM, OF LOWELL, MICHIGAN

RAKE CLEANING DEVICE

Application filed March 9, 1931. Serial No. 521,259.

The object of this invention is to provide a cleaning device which may be attached to a rake of commercial type, and which shall include an element provided with apertures for the teeth, and movable incident to the ordinary use of the rake, from a point or points adjacent to the ends of the teeth, toward the shank portions thereof,—so that a constant cleaning operation will be under way without particular attention on the part of the user of the device.

A further object is to provide a device which may be instantly applied, which is adjustable in order that it may be mounted on rakes of different makes, and a device which may also be detached without difficulty, when it is not needed, owing to the particular work which the user of the implement may have under way.

With the foregoing and other objects in view, the invention consists in the novel features of construction, and in the novel arrangement of the elements herein disclosed, it being understood that modifications, alterations or changes may be made within the scope of the claims without departing from the spirit of the invention.

In the drawings forming part of this application:—

Figure 1 is a view of the device in elevation, as observed from that side of the series of teeth, toward the operator or workman.

Figure 2 is a view, also in elevation, the cleaning device having moved from the position of Figure 1 to an upper position, representing the cleaning movement, effected by pressure upon the downwardly extending members appearing at the ends of Figure 1.

Figure 3 is a section on line 3—3 of Figure 1.

Figure 4 is a section on line 4—4 of Figure 2.

Figure 5 is a detail view showing a fragment of the channel member constituting the cleaning device per se.

A rake, assumed to be of a standard commercial type, includes the bar 10, which is apertured in a direction transversely of its main axis for the accommodation of the teeth, each comprising a U-shaped device 11, having end portions 11' and 11".

The handle of the device is shown in fragmentary form, and is designated 12, it being understood that no special adaptation of the rake per se is required.

The cleaning device includes the channel member 14, having rolled edges, as shown at 15, and a wire received by these rolled edges is provided with loop portions 16 and 17, appearing at the ends of the device, and constituting foot members or pressure devices adapted to bear upon the surface of the ground, incident to the ordinary use of the rake. Slight pressure will cause the channel member 14 or the cleaning device per se to move upwardly, and the edge portions of the apertures shown at 18, passing along the teeth of the rake, will effect the cleaning operation, if particles of earth adhere to the teeth, whereas movement of the element 14 from the position of Figure 2 to that of Figure 1 will remove leaves and the like from the teeth. Apertures 18 may be in the form of slots, if desired, as shown in Figure 5, and they are of such form, and are so spaced that variation in the spacing of the teeth of the rake is allowed for.

Stirrups, or straps, are pivotally connected with the channel member, constituting the cleaning device, the points of pivotal connection being designated 20, and the straps being shown at 21. These devices are in loop form, and in one sense represent guides passing around the element 10 of the rake and operating somewhat freely with reference thereto. Transverse pins 22 pass through apertures oppositely located, as will be observed from an inspection of Figures 3 and 4, and these pins pass over the element 10. Several apertures may be provided, as shown at 23, so that allowance is made for adjustment.

In order to provide resilient action, I employ springs at the points shown in Figures 1 and 2, and each spring includes a central loop portion 25, formed on an angle end portion of each spring element. A coil or the like is shown at 26, and the wire structure of which the device is formed extends thence in a length 27, providing an arm or the like, the extreme end portion including another coil 26', and the end of the wire engaging the channel member or cleaning device 14. An aperture 28 affords accommodation for the extreme end of the wire, and it is retained within the apertured portion in any suitable manner.

In operation, the foot members at the ends of the channel bar contact with the surface of the ground, on the downward stroke of the implement, and cause the channel bar to move upwardly to produce the cleaning operation. The upward stroke involving the lifting of the implement, causes the channel cleaning bar to return from the position of Figure 2 to the normal position of Figure 1. The movement of the channel bar toward element 10 will clean the teeth so far as adhering particles of earth and the like are concerned, and punctured leaves will be removed when the channel bar moves toward the position of Figure 1.

The free ends 21' of the stirrups facilitate the application of the attachment and the removal thereof, from the rake.

What is claimed is:—

1. In a device of the class described, a channel element having apertures in the web of the channel, foot members extending downwardly from the ends of the channel, for engaging the ground when the apertured portion of the channel is positioned for slidable engagement with the teeth of a rake, adjustable devices for mounting the channel member on a tooth-mounting element of a rake, and resilient devices interposed between the channel member and said tooth-mounting member and yieldable incident to the normal use of the rake with the foot members in contact with the ground.

2. A structure comprising the elements of claim 1, in which the adjustable devices are of stirrup-like formation and constitute guiding means slidable vertically with reference to the tooth-mounting element.

In testimony whereof I affix my signature.

ADOLPHE STRAHM.